United States Patent [19]
Derven et al.

[11] Patent Number: 5,979,921
[45] Date of Patent: Nov. 9, 1999

[54] FOLDING BICYCLE TRAILER

[75] Inventors: John Derven; Donald A. George; James Peter Lewontin; Patrick Logan, all of Eugene, Oreg.

[73] Assignee: Burley Design Cooperative, Eugene, Oreg.

[21] Appl. No.: 08/932,940

[22] Filed: Sep. 17, 1997

[51] Int. Cl.⁶ .................................................. B62K 27/00
[52] U.S. Cl. ...................... 280/204; 280/491.1; 280/646; 280/401
[58] Field of Search ................................ 280/401, 491.1, 280/204, 639, 645, 646, 656; 296/35.4, 37.4, 37.7, 97.21

[56] References Cited

U.S. PATENT DOCUMENTS

| | | | |
|---|---|---|---|
| 2,456,013 | 12/1948 | Nelson | 280/639 |
| 2,469,506 | 5/1949 | Kerr et al. | 280/639 |
| 2,879,072 | 3/1959 | Rear et al. | 280/639 |
| 4,256,321 | 3/1981 | Trulove . | |
| 4,614,352 | 9/1986 | Cervantes . | |
| 4,624,467 | 11/1986 | Burns | 280/656 |
| 4,758,008 | 7/1988 | Moddejonge . | |
| 4,794,727 | 1/1989 | Smith | 280/491.1 |
| 5,020,814 | 6/1991 | George et al. . | |
| 5,161,814 | 11/1992 | Walker | 280/656 |
| 5,259,634 | 11/1993 | Berner et al. . | |
| 5,308,096 | 5/1994 | Smith | 280/204 |
| 5,356,197 | 10/1994 | Simic . | |
| 5,454,577 | 10/1995 | Bell . | |
| 5,474,316 | 12/1995 | Britton . | |
| 5,577,746 | 11/1996 | Britton . | |
| 5,599,033 | 2/1997 | Kolbus et al. | 280/204 |
| 5,829,770 | 11/1998 | Chiu | 280/656 |

Primary Examiner—Daniel G. DePumpo
Attorney, Agent, or Firm—Robert D. Varitz, PC

[57] ABSTRACT

A folding bicycle trailer includes a body portion having a passenger-receiving area, axle mounts, tongue mounts, and canopy mounts. The body portion is a unitary, one-piece monocoque structure, with the mounts being integrally formed therewith. An axle member is secured to the axle mount and carries wheel supports on each end thereof. The wheel supports are shiftable between an operable, extended position and a folded, storage position. A wheel is carried on each wheel support for free rotation relative thereto. An elongate tongue is carried on the tongue mount and extends forward from the body portion. A canopy frame, including fore and aft canopy members, is mounted on the body portion and is shiftable between a collapsible condition and a raised condition.

21 Claims, 6 Drawing Sheets

FOLDING BICYCLE TRAILER

FIELD OF THE INVENTION

This invention relates to bicycle trailers, and specifically to a bicycle trailer which is foldable for storage and transportation, and which incorporates a hard-shell, unitary-piece frame.

BACKGROUND OF THE INVENTION

Bicycles are becoming a more popular form of transportation in the United States, emulating the popularity of such human-powered transportation in other parts of the world. A frequent scenario, however, is that bicycle trips involve small children who are not readily carried on a bicycle, and who are too small to ride either a separate cycle or a trailing cycle. To this end, a variety of bicycle trailers have been developed, whose primary purpose is for carrying children, however, the trailers also serve as utility trailers for carrying cargo, camping equipment, the family pets, etc.

One of the most successful collapsible bicycle trailers is described in U.S. Pat. No. 5,020,814, to George et al, granted Jun. 4, 1991, for "Collapsible Bicycle Trailer." While this particular bicycle trailer has met with great commercial success, it is somewhat labor intensive to manufacture and requires the removal of the wheels for compact transport and storage.

Berner et al., U.S. Pat. No. 5,259,634 discloses a convertible infant stroller and trailer which also includes a metal tubular frame and which, to be completely collapsed, requires the removal of the wheels therefrom.

Bell, U.S. Pat. No. 5,454,577, and Britton, U.S. Pat. No. 5,474,316, both disclose trailers with tubular metal frames which require the removal of the wheels for the collapsing of the trailer. Britton, U.S. Pat. No. 5,577,746 discloses a trailer which incorporates a pan structure to form a solid bottom to the trailer, which pan structure which fits over a conventional tubular frame.

The aforementioned bicycle trailers, while suitable for their intended purposes, all involve many parts and removal of the wheels for transport and storage.

SUMMARY OF THE INVENTION

The folding bicycle trailer of the invention includes a body portion having a passenger-receiving area, axle mounts, tongue mounts, and canopy mounts. The body portion is a monocoque structure, with the mounts being integrally formed therewith. An axle member is secured to the axle mount and carries wheel supports on each end thereof. The wheel supports are shiftable between an operable, extended position and a folded, storage position. A wheel is carried on each wheel support for free rotation relative thereto. An elongate tongue is carried on the tongue mount and extends forward from the body portion. A canopy frame, including fore and aft canopy members, is mounted on the body portion and is shiftable between a collapsed condition and a raised condition.

It is an object of the invention to provide a collapsible bicycle trailer which is easily assembled from considerably fewer than the normal number of parts associated with such devices.

Another object of the invention is to provide a bicycle trailer which may be folded into a compact condition without the removal of wheels, tongue, canopy, etc.

A further object of the invention is to provide a bicycle trailer which incorporates a monocoque hard-shell frame to which the components of the trailer are mounted.

These and other objects and advantages will become more fully apparent as the description which follows is read in conjunction with the drawings.

BRIEF DESCRIPTION OF THE DRAWINGS

FIG. 5 is a side elevation of the bicycle trailer, with the trailer in a folded condition.

FIG. 10 is a partial side elevation of a wheel support in an extended position.

FIG. 11 is a side elevation of a wheel support in a partially folded position.

DETAILED DESCRIPTION OF THE PREFERRED EMBODIMENT

Figure 1:
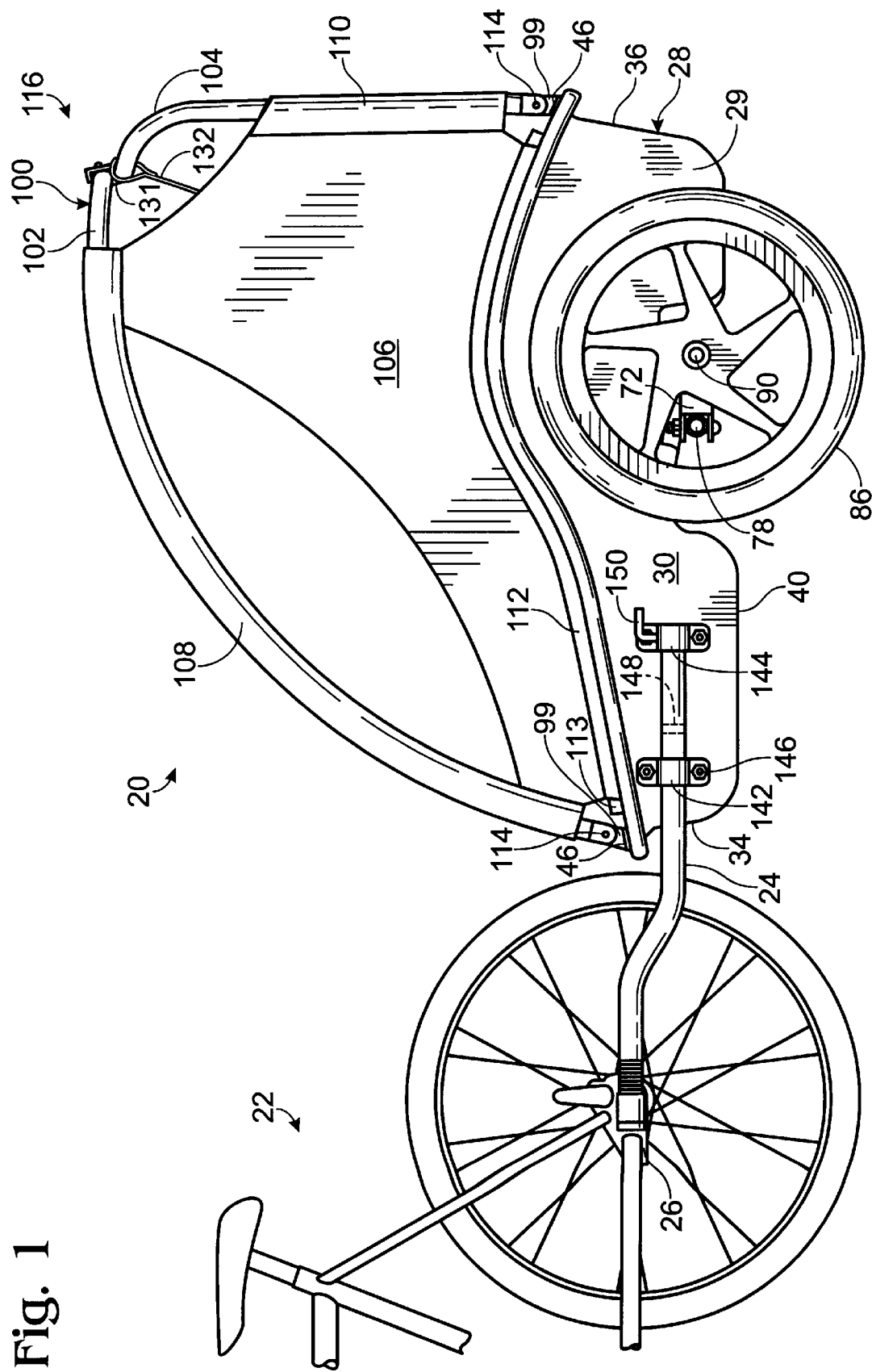
FIG. 1 is a side elevation of a folding bicycle trailer constructed according to the invention, in an environmental setting.

Referring now to FIG. 1, a folding bicycle trailer constructed according to the invention is depicted generally at 20. Trailer 20 is connected to a bicycle 22 by means of a trailer tongue 24 and a hitch 26. Hitch 26 may be of the type described in U.S. Pat. No. 4,721,320, of Creps et al, for "Bicycle Trailer Hitch," granted Jan. 26, 1988.

Figure 2:
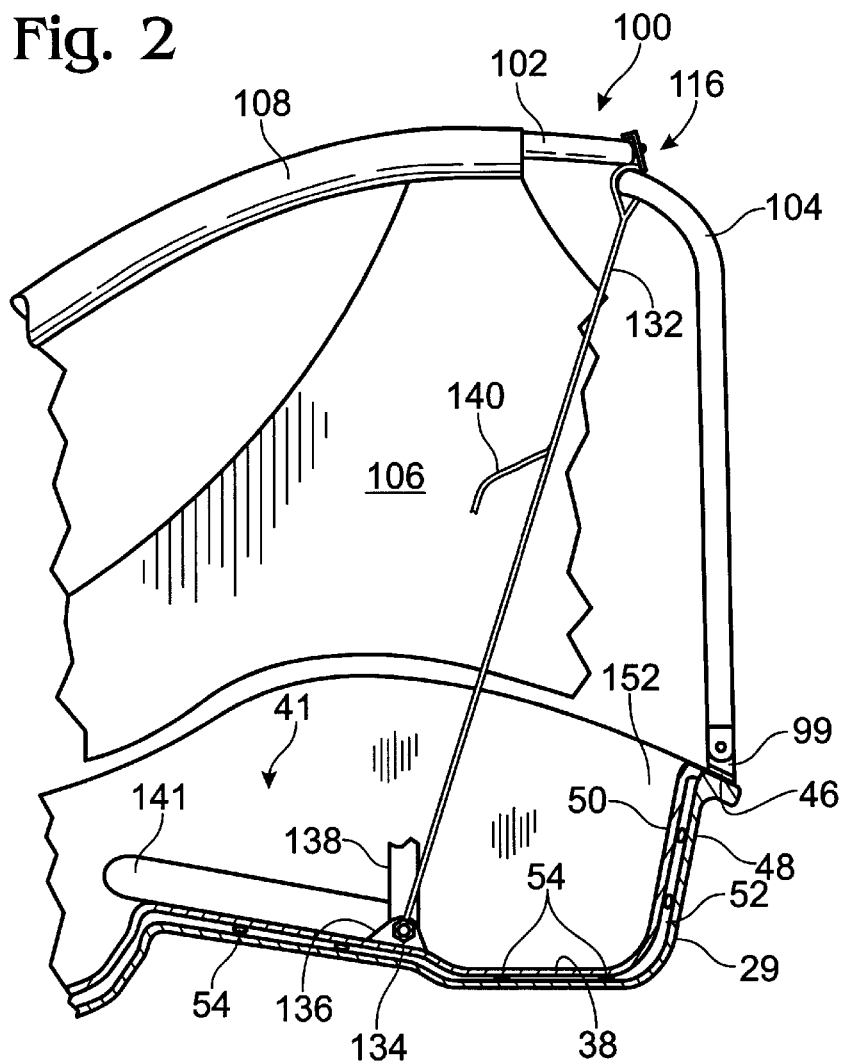
FIG. 2 is an enlarged, partial side elevation of the trailer of FIG. 1, with portions broken away to show detail.
Figure 3:
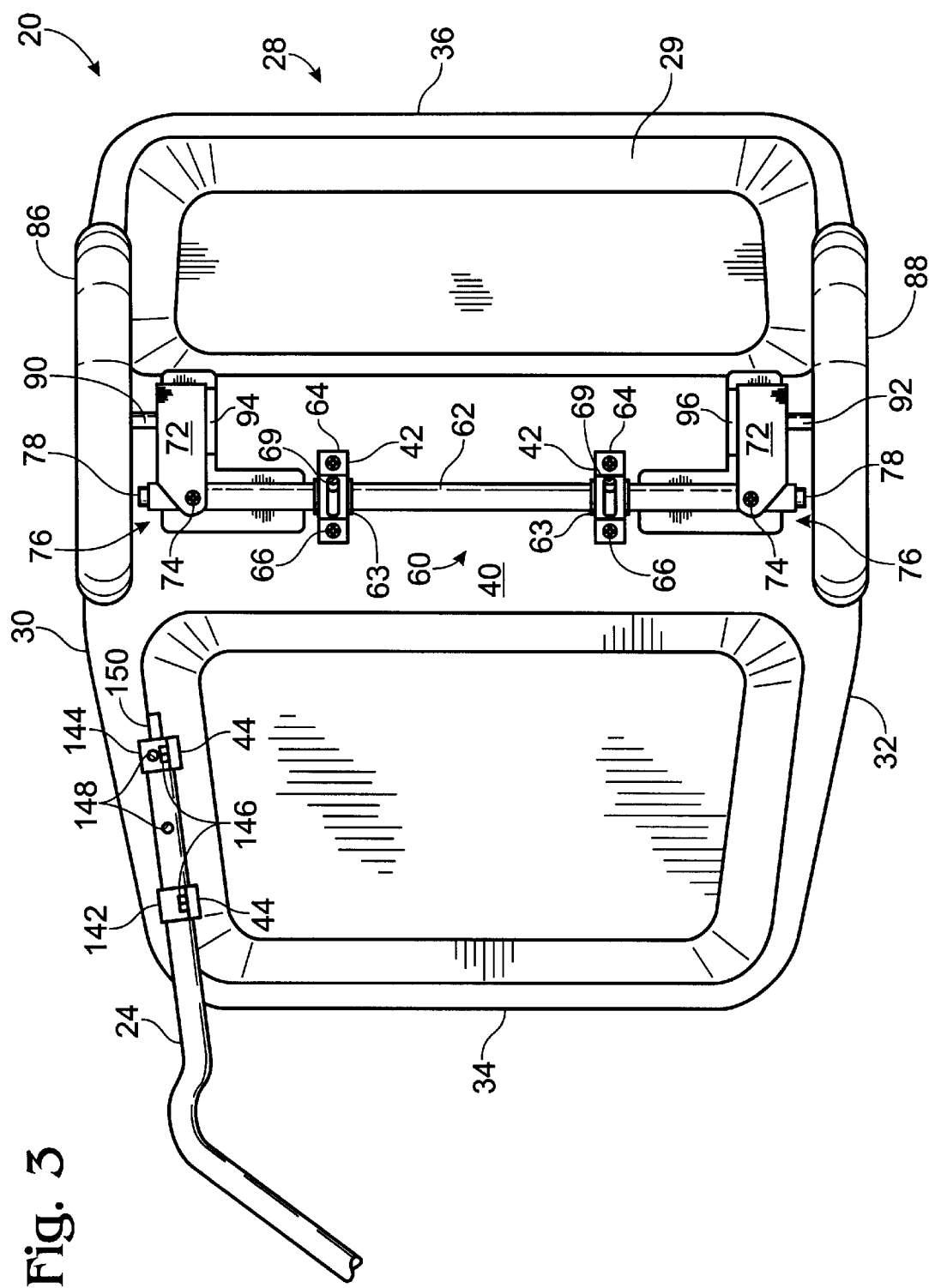
FIG. 3 is a bottom plan view of the bicycle trailer of the invention.
Figure 4:
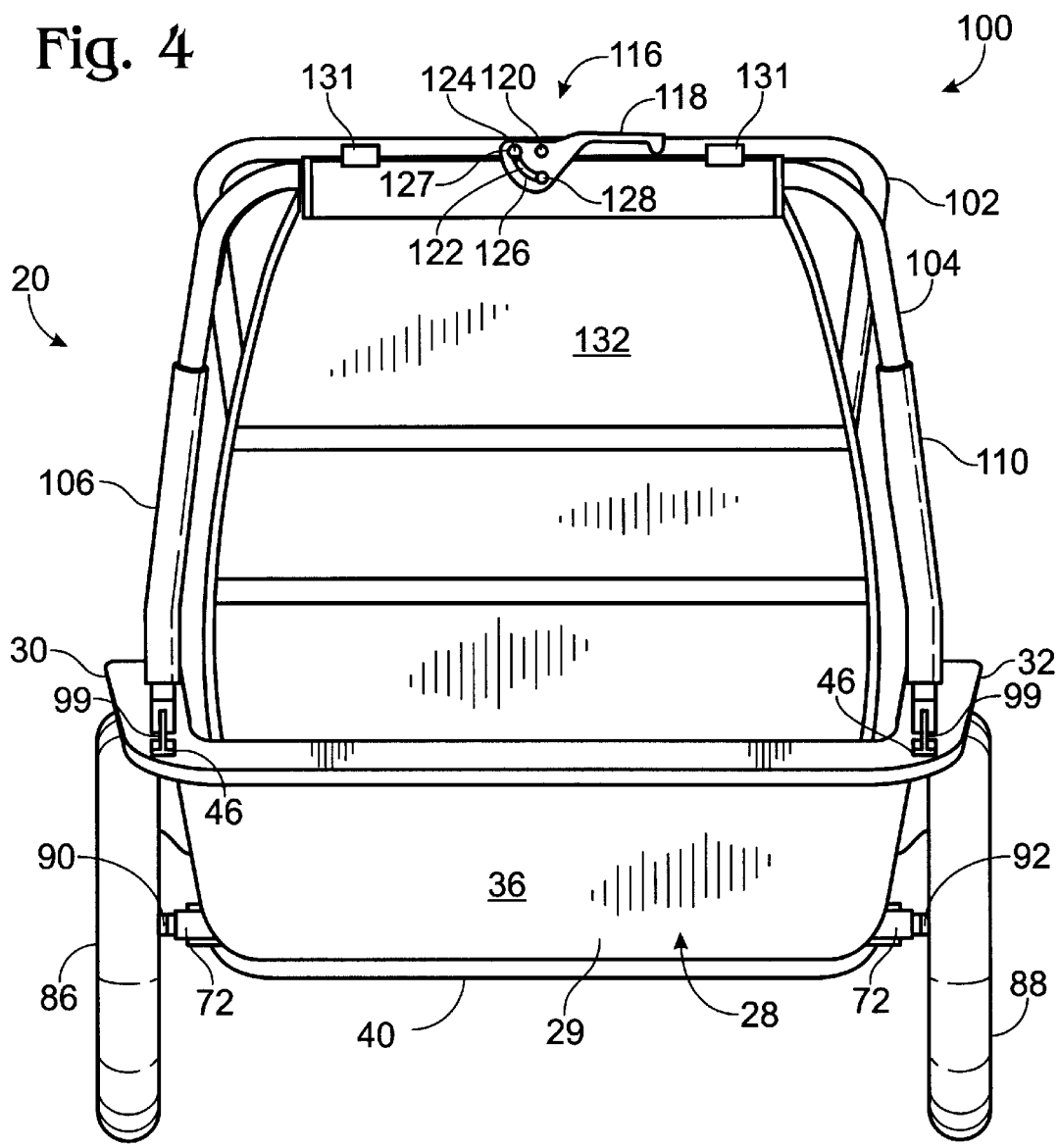
FIG. 4 is a rear elevation thereof.

Referring now to FIGS. 1, 2, and 3, bicycle trailer 20 will be described in greater detail. Trailer 20 includes a hard-shell body portion 28, which includes a monocoque frame 29 and various mounting structures for the other parts of the trailer. In the preferred embodiment, body portion 28 is a one-piece structure formed by a molding process, and specifically by a blow-molding process. Body portion 28 includes spaced-apart sides 30, 32, a front end 34, and a rear end 36. Body portion 28 also includes a top side 38 and a bottom side 40. Top side 38 is recessed within the sides, front and rear of body portion 28 and comprises what is referred to herein as a passenger-receiving area, 41.

As previously noted, frame 29 is formed by a blow-molding process to form a monocoque hard-shell unitary structure, which, with the integrally formed mounts, such as axle mounts 42, tongue mounts 44 and canopy mounts 46, forms body portion 28. As shown in FIG. 2, the blow-molding process forms a hollow, one-piece structure having a double wall, 48, 50. Frame 29 is formed of plastic material, specifically HDPE plastic. A void 52 is located between the layers of plastic material in a number of places over the surface of frame 29. However, where it is desired to provide a mount, the two layers of plastic are bonded together to provide the additional stiffening required for such a mount. The mounts are formed by what is known as a "weld-off" process, to bind the two sides of the structure together, forming a more rigid area relative to the surrounding area. This construction provides a single-piece, monocoque passenger compartment/frame combination which is inexpensive to manufacture when compared to assembly of a conventional metal tubing frame. Additional weld-offs, such as weld-offs 54, are provided in a grid-work throughout the monocoque frame to provide additional strength to the body portion. The construction also provides a stronger frame for the trailer, and greater protection for the occupant thereof. It should appreciated that in addition to the mounts formed in the body portion, brackets are provided, which will be described later herein, for securing the various components to the body portion.

Figure 7:
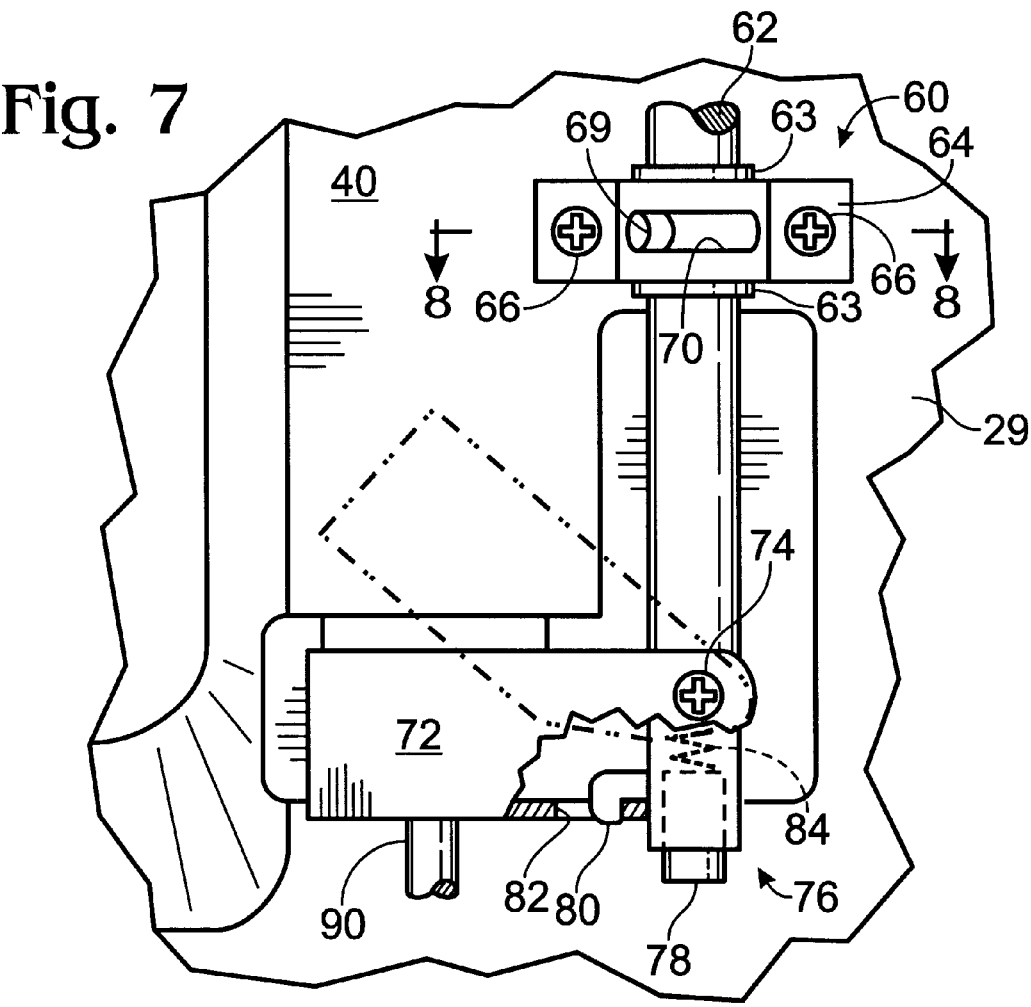
FIG. 7 is an enlarged view of a wheel support of the invention.
Figure 8:
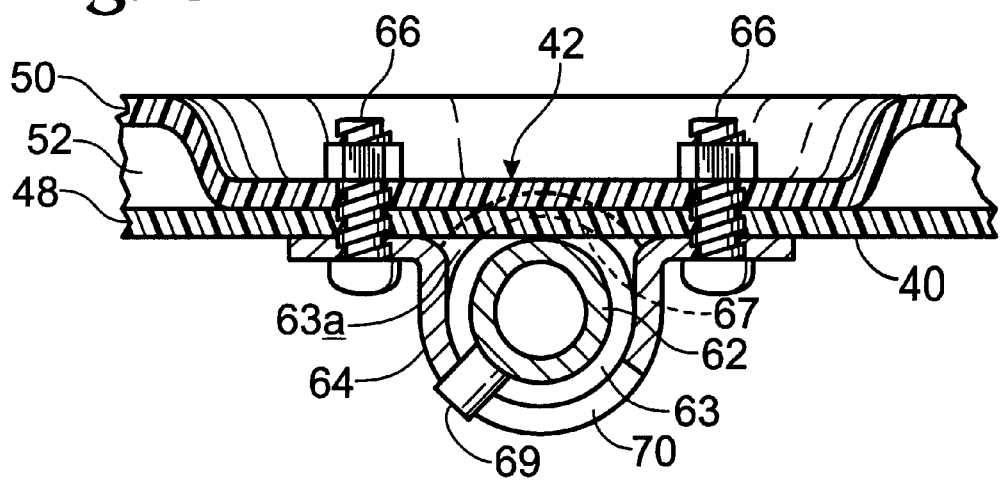
FIG. 8 is a medial section through an axle bracket of the invention.

Referring now primarily to FIG. 3, but with additional reference to FIGS. 5, 7, and 8, the axle and wheel structure of the invention will be described. Trailer 20 includes an axle, depicted generally at 60. Axle 60 is constructed and arranged to provide easy folding of the trailer wheels relative to body portion 28, without the requirement of removing the wheels, as is the case with known bicycle trailers. Axle 60 includes an axle member 62, which is secured to the bottom side 40 of body portion 28 by means of bushings 63 received within brackets 64. Bushings 63 include a flange, 63a, at one edge thereof, and are recessed into and captured against bottom side 40 of body portion 28. A pair of bushings 63 are received in each bracket 64, and are spaced apart from one another therein. Brackets 64 are secured to axle mount 42 by means of fasteners 66, which in the preferred embodiment take the form of nut-and-bolt fasteners. Axle mount 42 includes bores for receiving fasteners 66, and also include an indented area 67 that receives bushings 63.

Axle member 62 has a pair of spaced-apart pins 69 located thereon which pins are received within a slot 70 of bracket 64, and between the pair of bushings 63. The brackets thus secure the axle member to the axle mounts on the body portion and limit rotation, or pivoting, of the axle member relative to the body portion, as rotation of axle member 62 is limited to the extent of the movement of pin 69 within slot 70, for reasons which will become apparent.

A wheel support 72 is located at each end of axle member 62. Wheel support 72 is shiftable between an operable, extended position, as shown in FIGS. 3, 7 and 10; an intermediate position, shown in FIG. 11; and a folded storage position, as shown in FIG. 5 and at the right side of FIG. 9. The wheel support is shown in an intermediate position on the left side of FIG. 9. Wheel support 72 is fixed on axle member 62 by means of a fastener 74, which allows the wheel support to pivot thereabout. A wheel support latch, shown generally at 76 in FIG. 7 is operable to maintain wheel supports 72 in their operable, extended position. Wheel support latch 76 includes a push button 78, which extends beyond the end of axle member 62 at each end thereof, and is captured therein. A latch pin 80 extends outward from a side of axle member 62 and engages a slot 82 formed in wheel support 72. A spring 84 is operable to bias the wheel support latch mechanism to an engaged position. Pushing button 78 along its longitudinal axis shifts the wheel support latch mechanism to a disengaged position, which allows the folding of wheel support 72 and its associated wheel.

Figure 9:
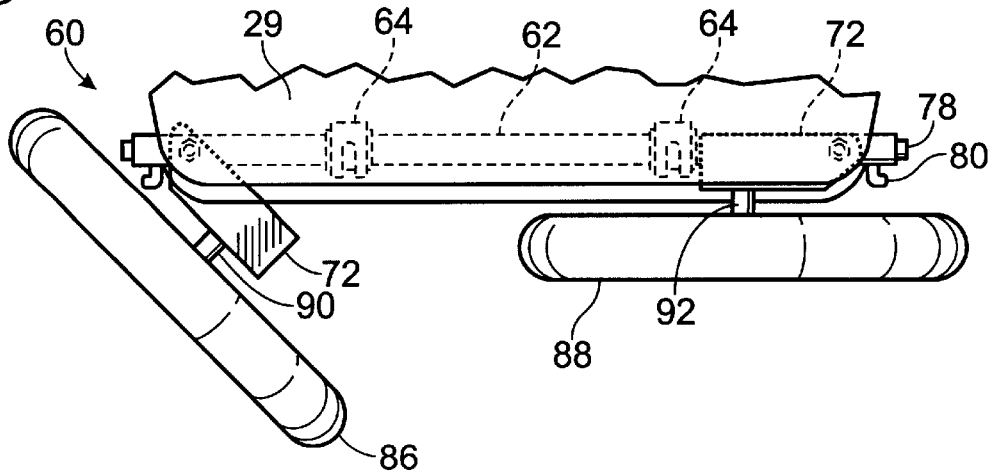
FIG. 9 is a partial rear elevation of the trailer, depicting the wheels thereof in successive stages of folding.
Figures 5, 10, 11:
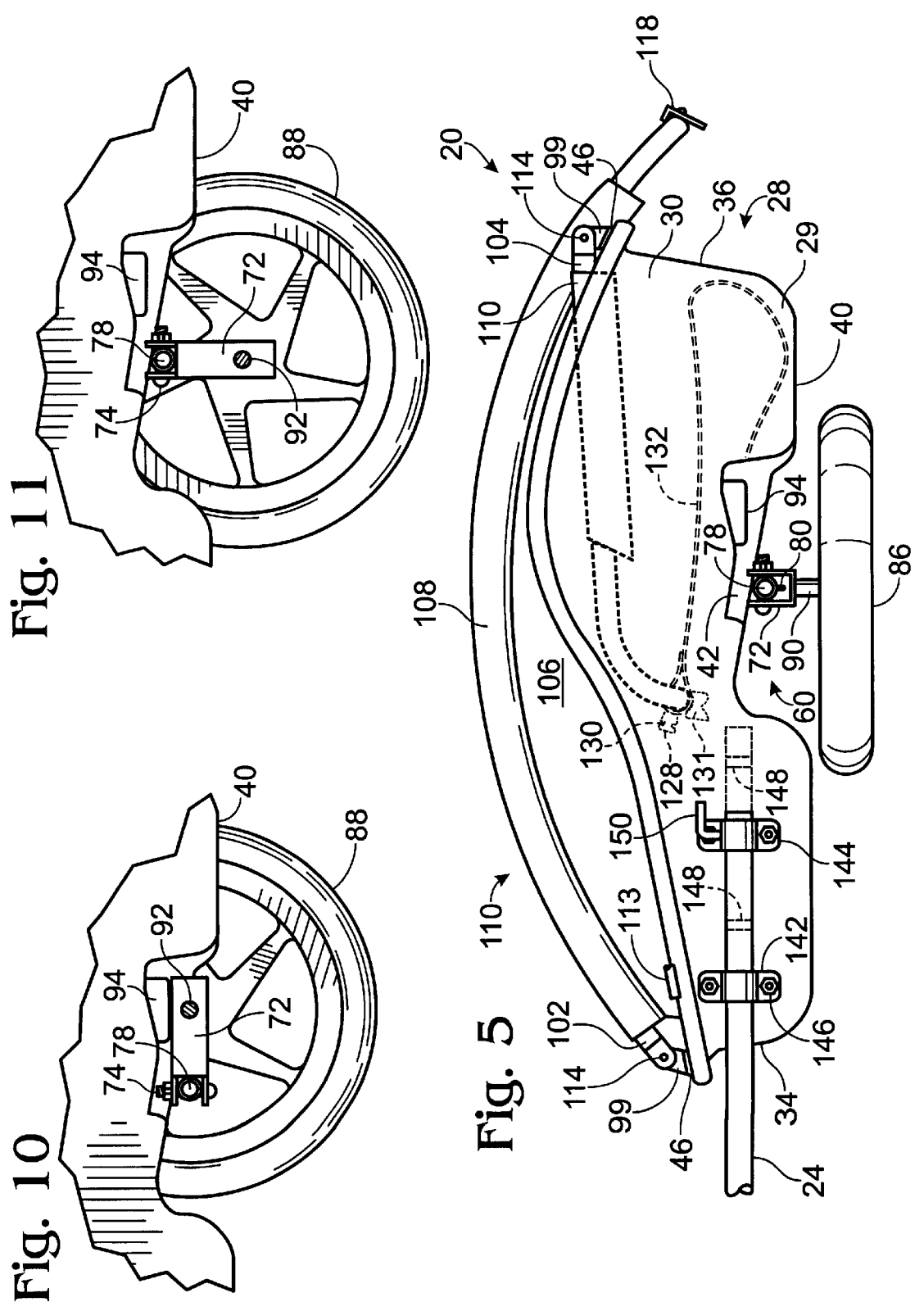

Referring now to FIGS. 9, 10, and 11, and initially to FIG. 10, it may be seen that wheels 86, 88, are carried on wheel supports 72 and are mounted on axle pins 90, 92, respectively, such that the wheels are free to rotate relative to the axle pins and the wheel supports. As depicted in FIG. 10, the wheels are extended and in an operable position, such that wheel supports 72 trail axle member 62. Wheels 86, 88, in the preferred embodiment, include a ball-bearing hub, spokes and rim, and a pneumatic tire. It may be seen that wheel support 72 abuts a shock absorber, 94, which is secured to the bottom of body portion 28. A similar shock absorber 96 is located on the other side of body portion 28. Shock absorbers 94, 96 are formed of an elastomer material, and are provided to reduce the amount of road shock that is transmitted to trailer 20, as the elastomer material softens the contact between wheel supports 72 and body portion 28. The combination of the pivoting axle and shock absorbers 94, 96 provide a fully suspended, quieter riding trailer that is substantially more tip-over resistance than known bicycles trailers, because the combination reduces bouncing of the trailer, and tends to keep the body portion level and smooth-riding. This also increases passenger comfort.

As trailer 20 is lifted off of its wheels, axle member 62 rotates approximately 90 degrees within axle brackets 64, allowing wheel supports 72 to extend downward, as shown in FIG. 11. The rotation of axle member 62 is limited by the arc of slot 70 within bracket 64, restricted by the movement of pin 69 within slot 70. In the preferred embodiment, the rotation of axle member 62 relative to bracket 64 is slightly less than 90°. With wheel supports 72 in their downward facing position, buttons 78 may be depressed allowing the folding of wheel supports 72 towards the midline of the trailer, as progressively depicted in FIG. 9. Thus, the wheels of bicycle trailer 20 may be folded under body portion 28, thereby compacting the trailer without the necessity of removing the wheels therefrom. The components of the axle, brackets and wheel supports are generally, in the preferred embodiment, formed of steel components for strength and durability.

Referring now to FIGS. 1 and 5, the canopy frame of bicycle trailer will be described in greater detail. As previously noted, canopy mounts 46 are formed with body portion 28. Canopy mounts 46 are operable to secure a canopy frame bracket 99 to body portion 28. A canopy frame, shown generally at 100, is attached to canopy frame brackets 99. Canopy frame 100 includes a fore canopy frame member 102, fixed to canopy mount brackets 99 at the front end 34 of body portion 28, and an aft canopy frame member 104, which is attached to canopy mount brackets 99 at the rear end 36 of body portion 28. The canopy frame members are, in the preferred embodiment, formed of aluminum tubing. As shown in FIG. 1, a canopy 106 extends over canopy frame 100. Canopy 106 is secured to canopy frame members by means of fabric tubes 108, 110, which are placed over the canopy frame members. Another fabric tube 112 is formed along the bottom margins of canopy 106, and is secured to body portion 28 by means of an extrusion 113, which is secured to the sides of body portion 28 by fasteners (not shown) extending upward from the bottom side of body portion 28.

It should be noted that fore and aft canopy frame members 102, 104 are secured to canopy mount brackets 99 by means of fasteners 114 which allow pivoting of the frame member relative to the canopy mount. As depicted in FIGS. 1, 2, 4, and 6, the canopy is in a raised condition. Canopy 106 is maintained in this condition by means of a canopy frame member locking mechanism, shown generally at 116 in FIG. 4. Frame member locking mechanism 116 includes a latch member 118 which, in the preferred embodiment, is carried on fore canopy frame member 102, and is pivotally mounted thereon by a fastener 120. Latch member 118 has a slot 122 therein which is formed in an eccentric manner, i.e., one end, 124 of slot 122, is further away from fastener 120 than is the other end 126 of slot 122. It will also be noted that end 124 includes an enlarged area 127 therein, which allows passage of a canopy latch pin 128 therethrough. Canopy latch pin 128 has a groove 130 thereabout for engaging slot 122.

A pair of saddle elements 131 are located on aft canopy frame member 104 and are secured thereto. Saddle elements 131 are conformal with the exterior of both the fore canopy frame member and the aft canopy frame member, and provide a seat and a limiting mechanism for the canopy frame members vis-a-vis one another. Saddle members 131 are formed of plastic material. The saddle members reduce vibration between the canopy frame members, and reduce the noise level of the trailer.

Figure 6:
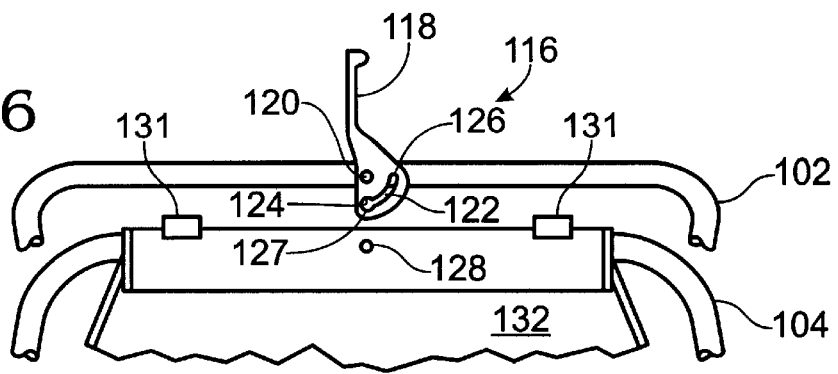
FIG. 6 is a partial rear elevation of the trailer, showing a locking mechanism in an unlatched position.

As shown in FIG. 6, latch member 118 may be raised to a substantially vertical position, and canopy latch pin 128 disengaged therefrom. The canopy may then be folded, as shown in FIG. 5, such that aft canopy frame member 104 folds down into the interior of body portion 28 and fore canopy frame member 102 folds thereover, with canopy 106 remaining attached thereto and folding therewith. Although, in the preferred embodiment, a single frame member locking mechanism is provided, and is sufficient to secure the fore and aft frame members to one another, dual locking mechanism may be appropriate in some circumstances.

When the canopy is raised from a collapsed condition to its raised condition, latch pin 128 is inserted into enlarged area 127, with latch member 118 in its substantially vertical, unlatched position. Latch member 118 is then rotated about fastener 120 to a substantially horizontal, latched position, drawing latch pin 128 towards fastener 120, and also causing the canopy frame members to be drawn towards one another, until such point as the fore canopy frame member engages saddles 131 on the aft canopy frame member, thereby locking the canopy frame into its raised condition.

As shown in FIG. 2, canopy 106 includes an aft portion 132, which extends from the top of aft canopy frame member to a bar 134, which is fixed in a seat mount 136 on the interior of body portion 28. This structure forms the seat back for the trailer. A lap belt 138 is also secured to mount 136, and a shoulder harness 140 is attached to canopy aft portion 132. A seat cushion 141 is located in passenger-receiving area 41, ahead of bar 134.

Turning now to FIGS. 1 and 5, trailer tongue 24 will be described in greater detail. A front tongue mounting bracket 142 and a rear tongue mounting bracket 144 are provided and are attached to tongue mounts 44 on body portion 28, in this embodiment, on the left side of the body portion adjacent front end 34 thereof. In the preferred embodiment, tongue brackets are held in place by nut-and-bolt fasteners, 146. Tongue 24 is carried in the tongue brackets and in turn on the tongue mounts, and extends forward of body portion 28. As previously noted, a hitch 26 is located at the forward end thereof for fastening the trailer to a bicycle. The tongue mount includes an adjustment mechanism, located on bracket 144, which allows the tongue to be adjustable fore and aft relative to body portion 28. This is accomplished by means of bores 148 which extend through tongue 24 and which receive a pin 150 therein. As shown in FIG. 5, in solid lines, tongue 24 is fully extended. Pin 150 may be removed and the tongue moved aft, to the location depicted by the dashed lines, (1) in order to make the trailer more compact for storage, or (2) when the bicycle trailer is used as a stroller. To this end, a receiver is provided on hitch 26 to receive a stroller wheel, as shown in U.S. Pat. No. 5,267,744, granted Dec. 7, 1993, to Berry et al., for "Stroller Wheel Assembly for Bicycle Trailer," which is incorporated herein by reference. An auxiliary handle may be secured to, for instance, canopy frame 100, to provide a handle for the now converted stroller/trailer.

Another feature of the tongue mount is that the tongue may be completely removed to further collapse the trailer for storage and transport. Tongue 24, in the preferred embodiment, has a rectangular cross section which conforms to the interior cross section of brackets 142, 144. By providing a rectangular cross section, rotation of tongue 24 along its longitudinal axis is eliminated, thereby providing greater stability for the trailer.

As depicted in FIG. 2, it will be seen that a cargo area 152 is provided in back of aft canopy portion 132 to facilitate transport of those necessary items when traveling with small children. The trailer may also be fitted with a rain and/or sun cover to protect the occupant or contents of the trailer during inclement weather.

Thus, a new bicycle trailer has been disclosed. The reduced cost of construction and the increased strength and protection offered by the one-piece body portion/frame provides significant advantages. The one-piece body portion/frame simplifies construction and maintenance. The construction of the pivoting axle, shock absorbers and one-piece body provides a quieter riding trailer, that is less prone to transmit road shock to its occupant, thereby making for a more comfortable ride. The shock absorbing properties of the axle and body make the trailer less likely to tip over, making the trailer safer. The axle construction and canopy construction make for a trailer that folds to a compact size for transport and storage without having to take wheels or portions of the canopy off before transport and storage.

Although a preferred embodiment of the invention has been disclosed, it should be appreciated that further modifications and variations may be made thereto without departing from the scope of the invention, as defined in the appended claims.

We claim:

1. A folding bicycle trailer, comprising:

a body portion including a passenger-receiving area, axle mounts, tongue mounts, and canopy mounts, and wherein said axle mounts, said tongue mounts, and said canopy mounts are integrally formed with said body portion;

an axle member secured to said axle mount including means for limiting rotation relative thereto;

wheel supports rotatably fixed to each end of said axle member, wherein said wheel supports are shiftable between an operable, extended position, and a folded, storage position;

a wheel carried on each wheel support for free rotation relative thereto;

an elongate tongue carried on said tongue mount and extending forward from said body portion; and a canopy frame, including a fore canopy frame member and an aft canopy frame member, both canopy frame members being mounted on said body portion and being shiftable between a collapsed condition and a raised condition.

2. The bicycle trailer of claim 1 which further includes brackets for securing said axle member to said axle mounts and wherein said means for limiting includes slots formed in a portion of said brackets which receive pins fixed to said axle member for limiting the rotation of said axle member relative to said body portion.

3. The bicycle trailer of claim 1 wherein said wheel supports trail said axle member when said wheel support is in said extended position.

4. The bicycle trailer of claim 1 wherein said tongue has a hitch located at the free end thereof for connecting the trailer to a bicycle.

5. The bicycle trailer of claim 1 wherein said tongue mount includes an adjustment mechanism and wherein said tongue is adjustable fore and aft relative to said body portion.

6. The bicycle trailer of claim 1 wherein said tongue includes a receiver thereon for receiving a stroller wheel, wherein said canopy frame includes a handle receiver thereon for receiving a stroller handle, and which further includes a stroller handle.

7. The bicycle trailer of claim 1 which further includes a canopy frame member locking mechanism for securing said canopy frame members in said raised condition, including a latch member carried on one of said canopy frame members, said latch member being shiftable between a latched position and an unlatched position, and a latch pin carried on the other of said canopy frame members; wherein said latch pin is received in said latch member and, with said latch member shifted to its latched position, causes said one canopy frame member to be drawn towards and engage said other canopy frame member.

8. The bicycle trailer of claim 7 wherein said latch member has an eccentric slot therein for receiving said latch pin, and wherein said latch pin has groove thereabout for engaging said eccentric slot in said latch member.

9. The bicycle trailer of claim 1 wherein said body portion includes a pair of spaced-apart sides, a front end, a rear end, a top side, and a bottom side, and wherein said axle mount is located on the bottom side of the said portion, said tongue mount is located on a side of said body portion adjacent the front end thereof.

10. The bicycle trailer of claim 9 wherein said body portion is a one-piece monocoque structure formed by molding.

11. A folding bicycle trailer, comprising:
 a body portion including a passenger-receiving area, axle mounts and tongue mounts, wherein said body portion is a unitary, one-piece monocoque structure and said axle mounts and said tongue mounts are integrally formed therewith, wherein said body portion includes a pair of spaced-apart sides, a front end, a rear end, a top side, and a bottom side; and wherein said axle mounts are located on the bottom side of said body portion, and wherein said tongue mounts are located on said body portion adjacent the front end thereof
 an axle including:
   an axle member secured to said body portion for limited rotation relative thereto, and a pin fixed to said axle member;
   brackets for securing said axle member to said axle mounts, where each bracket has a slot formed therein about a portion thereof for receiving said pin for limiting the rotation of said axle member relative to said body portion;
   wheel supports rotatably fixed to each end of said axle member, wherein said wheel supports are shiftable between an operable, extended position, and a folded, storage position, wherein said wheel supports trail said axle member when said wheel support is in said extended position;
   a wheel carried on each wheel support for free rotation relative thereto;
   a resilient shock absorber located between said body portion and said wheel support for diminishing transmission of road shock to said body portion; and
 an elongate tongue carried on said tongue mount and extending forward from said body portion, wherein said tongue has a hitch located at the free end thereof for connecting the trailer to a bicycle.

12. The bicycle trailer of claim 11 wherein said body portion further includes canopy mounts integrally formed therewith, and which further includes a canopy frame, including a fore canopy frame member and an aft canopy frame member, both canopy frame members being mounted on said canopy mounts and being shiftable between a collapsed condition and a raised condition; and a canopy frame member locking mechanism for securing said canopy frame members in said raised condition.

13. The bicycle trailer of claim 12 which includes a latch member carried on one of said canopy frame members, said latch member having an eccentric slot formed therein, and being shiftable between a latched position and an unlatched position, and a latch pin, having a groove formed thereabout, carried on the other of said canopy frame members; wherein said latch pin is received in said eccentric slot of said latch member and, with said latch member shifted to its latched position, causes said one canopy frame member to be drawn towards and engage said other canopy frame member.

14. The bicycle trailer of claim 11 wherein said tongue mount includes an adjustment mechanism and wherein said tongue is adjustable fore and aft relative to said body portion.

15. The bicycle trailer of claim 14 wherein said tongue includes a receiver thereon for receiving a stroller wheel, and wherein said canopy frame includes a handle receiver thereon for receiving a stroller handle.

16. A folding bicycle trailer, comprising:
 a body portion including a passenger-receiving area, and integrally formed axle mounts, tongue mounts, and canopy mounts;
 an axle member secured to said axle mount;
 wheel supports fixed to each end of said axle member;
 a wheel carried on each wheel support for free rotation relative thereto;
 an elongate tongue carried on said tongue mount and extending forward from said body portion; and
 a canopy frame, including a fore canopy frame member and an aft canopy frame member, both canopy frame members being mounted on said canopy mounts and being shiftable between a collapsed condition and a raised condition; a canopy frame member locking mechanism for securing said canopy frame members in said raised condition, including a latch member carried on one of said canopy frame members, said latch member being shiftable between a latched position and an unlatched position, and a latch pin carried on the other of said canopy frame members; wherein said latch member has an eccentric slot therein for receiving latch pin; latch pin has groove thereabout for engaging eccentric slot in latch member; wherein said latch pin is received in said latch member and, with said latch member shifted to its latched position, causes said one canopy frame member to be drawn towards and engage said other canopy frame member.

17. The bicycle trailer of claim 16 wherein said body portion is a one-piece monocoque structure formed by molding, which includes a pair of spaced-apart sides, a front end, a rear end, a top side, and a bottom side, wherein said axle mount is located on the bottom side of said body portion, said tongue mount is located on a side of said body portion adjacent the front end thereof, and wherein said axle, tongue and canopy mounts are integrally formed in body portion.

18. The bicycle trailer of claim 16 which includes brackets for securing said axle member to said axle mounts and for limiting the rotation of said axle member relative to said body portion, and wherein said wheel supports are shiftable between an operable, extended position, and a folded, storage position, and wherein said wheel supports trail said axle member when said wheel support is in said extended position.

19. The bicycle trailer of claim 16 wherein said tongue has a hitch located at the free end thereof for connecting the trailer to a bicycle; wherein said tongue mount includes an adjustment mechanism and wherein said tongue is adjustable fore and aft relative to said body portion, and wherein said tongue includes a receiver thereon for receiving a stroller wheel, and wherein said canopy frame includes a handle receiver thereon for receiving a stroller handle.

20. A folding bicycle trailer, comprising:

a monocoque frame including a passenger-receiving area, a pair of spaced-apart sides, a front end, a rear end, a top side, and a bottom side, wherein said frame is formed of a polymer material having plural spaced-apart layers thereto, having a pocket formed between said spaced-apart layers, wherein said frame includes weld-off regions to form axle mounts, tongue mounts and canopy mounts; and wherein said axle mount is located on the bottom side of said frame;

an axle member secured to said frame;

brackets for securing said axle member to said axle mounts and for limiting the rotation of said axle member relative to said frame; and which further includes wheel supports located at each end of said axle member, wherein said wheel supports are shiftable between an operable, extended position, and a folded, storage position, and wherein said wheel supports trail said axle member when said wheel support is in said extended position;

a wheel carried on each wheel support;

an elongate tongue carried on said frame and extending forward therefrom, wherein said tongue has a hitch located at the free end thereof for connecting the trailer to a bicycle; and canopy mounts integrally formed with said frame, a canopy frame attached to said canopy mounts, including a fore canopy frame member and an aft canopy frame member, both canopy frame members being mounted on said body portion and being shiftable between a collapsed condition and a raised condition; and which includes a latch member carried on one of said canopy frame members, said latch member having an eccentric slot formed therein, and is shiftable between a latched position and an unlatched position, and a latch pin, having a groove formed thereabout, carried on the other of said canopy frame members; wherein said latch pin is received in said eccentric slot of said latch member and, with said latch member shifted to its latched position, causes said one canopy frame member to be drawn towards and engage said other canopy frame member.

21. The bicycle trailer of claim 20 wherein said tongue mounts include an adjustment mechanism and wherein said tongue is adjustable fore and aft relative to said body portion.

* * * * *